Fig. 1

Francis M. Eaton
INVENTOR

BY Edward M. Roney
ATTORNEY

Aug. 19, 1969  F. M. EATON  3,462,678
METHODS AND APPARATUS FOR INVESTIGATING MUDCAKE THICKNESS
Filed July 18, 1966  4 Sheets-Sheet 3

Francis M. Eaton
INVENTOR

BY Edward M. Roney
ATTORNEY

United States Patent Office 3,462,678
Patented Aug. 19, 1969

3,462,678
METHODS AND APPARATUS FOR INVESTIGATING MUDCAKE THICKNESS
Francis M. Eaton, Houston, Tex., assignor to Schlumberger Technology Corporation, Houston, Tex., a corporation of Texas
Filed July 18, 1966, Ser. No. 566,019
Int. Cl. G01v *3/02;* G01n *13/00*
U.S. Cl. 324—10                              21 Claims

ABSTRACT OF THE DISCLOSURE

In accordance with an illustration embodiment of the invention, methods and apparatus are shown for investigating the thickness of a mudcake on the wall of a borehole. More particularly, survey current is emitted from a current-emitting electrode and a plurality of monitoring electrodes monitor the potential distribution set up by the emitted survey current. The resistivities of two zones of the formations are obtained by measuring the potential differences between two pairs of the monitoring electrodes. These two potential difference signals are combined in accordance with a given relationship to produce a signal whose amplitude is monitored. When the monitored amplitude exceeds a given amplitude level, a gate is energized to generate a signal indicative of the fact that the mudcake thickness is greater than a predetermined thickness. In another embodiment, the potential of the current-emitting electrode is measured and used to adjust the given amplitude level at which the signal indicative of mudcake is generated.

---

This invention relates to methods and apparatus for investigating subsurface earth formations. More specifically, it has to do with well logging methods and apparatus which have a special utility for distinguishing permeable and impervious formations traversed by a borehole containing a drilling mud or other fluid having finely divided solids in suspension.

It is customary to use drilling muds when drilling a borehole under the accepted practice. Normally, the fluid pressure in the permeable formations traversed by a borehole is less than the hydrostatic pressure of the column of mud in the borehole, so that the mud and mud filtrate flows into those formations. However, such formations tend to screen out the finely divided particles suspended in the mud, so that a mudcake is formed on the wall of the borehole wherever there are permeable formations. On the other hand, the mud does not flow into impervious formations so that very little, if any, mudcake is formed on the wall of the borehole at the levels where impervious formations are found. Thus, the presence or absence of a mudcake on the wall of the borehole provides an indication as to whether or not the formations are permeable or impervious.

One system for ascertaining whether a mudcake is present on the walls of the borehole is shown in U.S. Patent No. 2,669,688 granted to H. G. Doll on Feb. 16, 1954. The above-named Doll patent determines the presence of a mudcake on the wall of the borehole by emitting current from a first electrode and monitoring the potential gradients at given distances from the current-emitting electrode. By monitoring the potential gradients at different distances from the current-emitting electrode, the resistivity of the earth formations at different lateral depths in the borehole can be determined. By making one of the regions of investigation measure primarily the resistivity near the borehole so as to be substantially influenced by the presence of a mudcake, and the other region of investigation somewhat further removed from the borehole so as to be substantially unaffected by the mudcake, it can be determined if a mudcake is present since the resistivity of the mudcake is usually different from, and relatively low with respect to the resistivity of the remainder of the formation surrounding the borehole.

However, prior mudcake detecting systems, and thus permeable zone detecting systems, have supplied the resistivity readings of the two regions of investigation to the surface of the earth so that an operator may visually note any variation that may occur between the two logs. To supply these two readings to the surface of the earth requires the utilization of more than two conductors, or alternatively, elaborate circuitry for transmitting multiple signals on one conductor pair. Additionally, such prior systems have required highly trained personnnel to visually determine from the two resistivity readings when a mudcake does in fact exist.

It is an object of the invention therefore to provide new and improved methods and apparatus for determining the presence or absence of mudcake on the wall of a borehole.

In accordance with one feature of the invention, apparatus for investigating earth formations traversed by a borehole comprises a plurality of electrodes adapted for movement through the borehole including a current-emitting electrode adapted for emitting current into the earth formations surrounding the borehole and a plurality of monitoring electrodes located at different distances from the current-emitting electrode. The apparatus further comprises means for supplying survey current between the current-emitting electrode and a current return point, and means responsive to the potentials of at least a portion of the plurality of monitoring electrodes for providing a signal indicative of the presence of mudcake surrounding the borehole.

In accordance with another feature of the invention, a method of investigating earth formations traversed by a borehole comprises moving a plurality of electrodes through the borehole, the electrodes including a current-emitting electrode adapted for emitting current into the earth formations surrounding the borehole and a plurality of monitoring electrodes located at different distances from the current-emitting electrode. The method further comprises supplying survey current between the current-emitting electrode and a current return point, and generating a signal indicative of the presence of mudcake surrounding the borehole in response to the potentials of at least a portion of the plurality of monitoring electrodes.

Preferably, in both the method and apparatus features of the present invention, the current-emitting electrode and at least two of the potential monitor electrodes are located on a borehole wall-engaging pad member. The difference between the potentials on two of the pad mounted monitor electrodes closest to the current-emitting electrode can be measured to produce a first potential difference signal and the difference between the potentials on two of the monitor electrodes spaced further from the current-emitting electrode than the above-mentioned two pad mounted electrodes can be measured to produce a second potential difference signal. These two potential difference signals can be combined in a desired manner, as by taking the ratio thereof or difference therebetween, to produce an output signal which is informative of mudcake thickness. In another form of the invention, the difference between the potential of two of the monitor electrodes can be measured and utilized to control the emission of current to thereby automatically make the potential difference measured between certain ones of the monitor electrodes proportional to the ratio of the two measured potential differences. In any event, the resulting ratio or difference signals can be utilized to send a signal from the well tool to the surface of the earth upon the ratio or difference signal attaining a selected amplitude level to thereby provide an indication of the mudcake thickness being greater than a predetermined amount.

For a better understanding of the present invention, together with other and further objects thereof, reference is had to the following description taken in connection with the accompanying drawings, the scope of the invention being pointed out in the appended claims.

Referring to the drawings.

Figure 1:
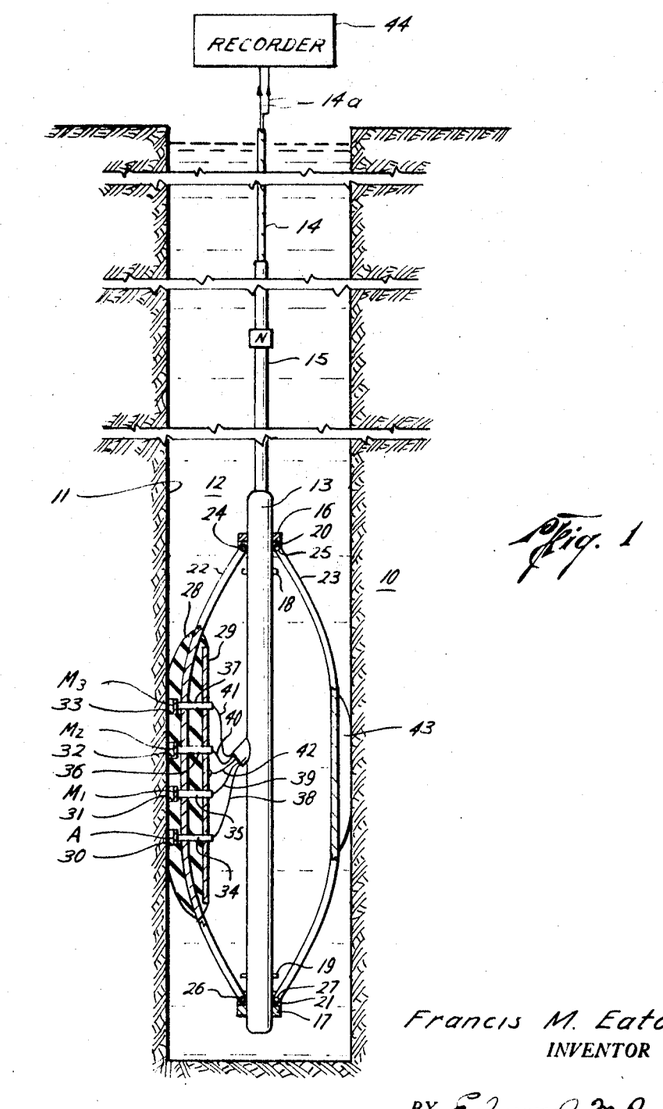
FIGURE 1 illustrates the mechanical features of the well logging apparatus of the present invention, including a pad member adapted to be pressed against the borehole wall and the electrodes utilized with the present invention.

Referring to FIGURE 1 of the drawings, there is shown a representative embodiment of the mechanical apparatus constructed in accordance with the present invention for investigating sub-surface earth formations 10 traversed by a borehole 11. The borehole 11 is filled with a conductive drilling fluid or drilling mud 12. The borehole investigating apparatus includes an elongated cylindrical support member 13, the interior portion of which has a fluid-tight housing containing the downhole electrical circuitry. The downhole apparatus, including support member 13, is suspended from the surface of the earth by means of an armored multiconductor cable 14, the lower 100 feet or so of which is covered with an electrical insulation material 15. At the surface of the earth, the cable 14 is reeled in and out of the borehole by a drum and winch mechanism (not shown).

Secured to the support means 13 are an upper collar 16 and a lower collar 17, both rigidly secured to the support means 13. Located somewhat below the upper collar 16 is an upper stop means 18 rigidly secured to the support means 13. Located just above the lower collar 17 is a lower stop means 19, likewise secured to the support means 13. Located intermediate of the upper fixed collar 16 and upper stop means 18 is a slidable collar 20. Located between the lower fixed collar 17 and the lower stop means 19 is a lower slidable collar 21. Located on opposite sides of the support means 13 are a pair of bowed springs 22 and 23, both of which are pivotally mounted at the upper ends 24 and 25 to the slidable collar 20. The lower ends 26 and 27 are pivotally mounted at the lower slidable collar 21. The bowed spring 22 has a wall-engaging pad member 28 secured thereto. The bowed spring 22 passes through the interior portion of the pad member 28, which has a metal plate 29 secured to the back side thereof.

Formed in the pad member 28 are a plurality of recesses 30, 31, 32 and 33 within which are embedded a plurality of electrodes A, $M_1$, $M_2$ and $M_3$ respectively. The survey current-emitting electrode A is located near the bottom of pad member 28. Located just above the survey current electrode A is a first monitor electrode $M_1$. Located just above the first monitor electrode $M_1$ is a second monitor electrode $M_2$, and a third monitor electrode $M_3$ is located above the second monitor electrode $M_2$. A hollow tube 34 made of non-conductive material passes from the survey current electrode A through an opening in the bowed spring 22 and the metal back plate 29 to provide a passage for a conductor 38 which connects survey electrode A to the electrical circuitry contained within the support means 13. In like fashion, a hollow tube 35 made of non-conductive material provides a passageway for a conductor 39 which connects the first monitor electrode $M_1$ to the electrical circuitry within the support means 13, a hollow tube 36 provides a passageway for a conductor 40 which connects the second monitor electrode $M_2$ to the electrical circuitry, and another hollow tube 37 provides a passageway for a conductor 41 which connects the third monitor electrode $M_3$ to the electrical circuitry. A conductor 42 connects the back plate 29 to the electrical circuitry contained within support means 13. Another electrode N is located on the insulated portion 15 of the multi-conductor cable 14 at some distance from the support means 13 and is connected by a conductor (not shown) to the downhole electrical circuitry.

A pad 43 is shown attached to the bowed spring 23 opposite the pad member 28. This pad 43 could merely be an inactive pad to facilitate the movement of the well logging apparatus through the borehole, or alternatively, could be a pad member containing electrodes for investigating the earth formations surrounding the borehole 11. The signals indicative of the information obtained by the well logging apparatus are transmitted from the electrical circuitry within downhole support means 13 through armored multi-conductor cable 14, via conductor pair 14a, to a recorder 44 located at the surface of the earth.

The bowed springs 22 and 23 pivotally mounted on slidable collars 20 and 21 maintain the pad members 28 and 43 in a wall-engaging position at all times in the borehole, and yet allow the wall logging apparatus to pass through relatively narrow portions of the borehole. This is accomplished since the slidable collars 20 and 21 are adapted to slide between fixed collars 16 and 17 and stop means 18 and 19 with bowed springs 22 and 23 maintaining pad members 28 and 43 pressed outwardly by the spring action of bowed springs 22 and 23. The particular type of apparatus for maintaining the electrodes A, $M_1$, $M_2$ and $M_3$ in a wall-engaging position shown in FIGURE 1 is only exemplary, and any other type of well logging apparatus for maintaining electrodes in a wall-engaging position could be utilized.

Figure 2:
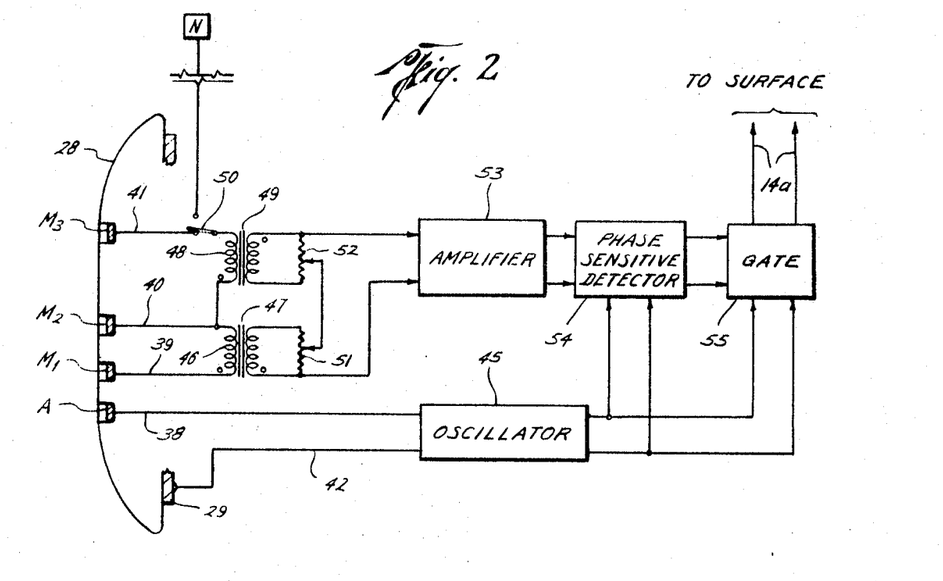
FIGURE 2 illustrates the various electrodes along with a schematic representation of one embodiment of the electrical circuitry utilized in connection with the present invention.

Turning now to FIGURE 2, there is shown a partial view of the pad member 28 and the various electrodes utilized in accordance with the present invention together with one embodiment of the electrical circuitry utilized with the present invention. An oscillator 45 supplies a constant current between the survey current electrode A and the metal plate 29 located on the back portion of the pad member 28, via conductors 38 and 42 respectively. The monitor electrodes $M_1$ and $M_2$ are connected across the primary winding 46 of transformer 47 via conductors 39 and 40 respectively. Monitor electrode $M_2$ is also connected to one side of the primary winding 48 of a transformer 49. The other side of primary winding 48 is connected to the common terminal of a switch 50, one of the switching terminals being connected to monitor electrode $M_3$ via conductor 41 and the other switching terminal being connected to the remote monitor electrode N.

The secondary winding of transformer 47 is connected across the resistance portion of a potentiometer 51. The secondary winning of transformer 49 is connected across the resistance portion of a potentiometer 52. The wiper arms of potentiometers 51 and 52 are connected together. One side of the resistance portion of potentiometer 51 and one side of the resistance portion of potentiometer 52 are connected to the input of an amplifier 53. Transformers 47 and 49 are wound such that the polarity of monitor electrode $M_1$ will be applied to one side of the input of amplifier 53 and the polarity of monitor electrode $M_2$ will be supplied to the other input of amplifier 53. That is, the signal applied to amplifier 53 will be the difference between the voltage $V_{M_1-M_2}$ across monitor electrodes $M_1$ and $M_2$ and the voltage $V_{M_2-M_3}$ or $V_{M_2-N}$ across the monitor electrodes $M_2$ and $M_3$ or $M_2$ and N. The output from amplifier 53 is applied to the input of a phase-sensitive detector 54, the output of phase-sensitive detector 54 being applied to a gate circuit 55, which for example, may be a Schmitt trigger. The output of gate circuit 55 is supplied to recorder 44 at the surface of the earth by conductor pair 14a which passes through armored multiconductor cable 14. Oscillator 45 supplies a phase-reference signal to phase-sensitive detector 54 and also supplies a signal to gate circuit 55.

Now concerning the operation of the FIGURE 2 apparatus, the monitor electrodes $M_1$ and $M_2$ will effectively measure the difference in potential of a region relatively close to the wall of the borehole. On the other hand, the difference in potential between monitor electrodes $M_2$ and $M_3$ or the difference in potential between monitor electrodes $M_2$ and remote monitor electrode N will effectively measure the difference in potential of a region further away from the wall of the borehole. The reason for this is that lines of equipotential are known to be perpendicular to current flow lines, and thus, the potential difference between a given pair of electrodes is the same as the potential difference of a corresponding region in the earth formations. Since the current emitted from survey current-emitting electrode A is held constant, the potential difference between each monitor electrode pair is proportional to the resistivity of the corresponding region in the earth formations.

If there is no mudcake on the wall of the borehole, thus signifying an impervious region, the resistivity measured by monitor electrode pair $M_1-M_2$ should be the same as the resistivity measured by either monitor pair $M_2-M_3$ or $M_2-N$. On the other hand, if there is a mudcake lining the wall of the borehole, the monitor pair $M_1-M_2$ will measure a different resistivity than is measured by either the monitor pair $M_2-M_3$ or $M_2-N$. Generally, the resistivity $R_{MC}$ of the mudcake will be somewhat less than the resistivity $R_{XO}$ of the invaded zone immediately surrounding the borehole behind the mudcake. Thus, to determine if there is a mudcake present, it need be determined whether or not there is a difference in the resistivity measured by the monitor pair $M_1-M_2$ and either the monitor pair $M_2-M_3$ or $M_2-N$. Either the monitor pair $M_2-M_3$ or $M_2-N$ can be used in combination with monitor pair $M_1-M_2$ to obtain the desired result of measuring the resistivities between regions of different lateral depths.

It has been discovered that, to a large degree, the thickness of the mudcake surrounding the borehole is substantially dependent on the type of mud utilized in the borehole, if a permeable zone is present. In an impervious zone, there will be substantially no mudcake present. Thus, it would be desirable to provide apparatus located within the support means 13 for supplying a signal to the surface of the earth whenever there is a specified difference in the resistivity measurements between the monitor pair $M_1-M_2$ and either the monitor pair $M_2-M_3$ or $M_2-N$. This signal would indicate a permeable zone.

To accomplish this, oscillator 45 supplies a constant current between the survey electrode A and the back plate 29 of pad member 28. It has been found that by returning the current to back plate 29, the measurements are substantially unaffected by the earth strata which is not directly in front of the pad member 28, by allowing the current from survey electrode A to return quickly to the back side of the pad member 28.

A signal is induced into the secondary winding of transformer 47 whose magnitude is proportional to the difference in potential between the monitor pair electrodes $M_1$ and $M_2$. A signal proportional to the difference in potential between monitor electrode $M_2$ and either monitor electrode $M_3$ or remote monitor electrode N, depending on the position of switch 50, is induced into the secondary winding of transformer 49. The windings of transformers 47 and 49 are wound such that the potential induced into the secondary winding of transformer 47 is subtracted from the potential induced into the secondary winding of transformer 49. The wiper arms of potentiometers 51 and 52 can be adjusted manually prior to a logging run in the borehole to provide the geometrical constant K of both the $M_1-M_2$ monitor pair and the $M_2-M_3$ or $M_2-N$ monitor pairs. This geometrical constant K is a well-known constant dependent on such things as electrode spacing and size and pad configuration.

A signal will be applied to amplifier 53 whose amplitude is proportional to the difference in potential between the monitor pair $M_2-M_3$ or $M_2-N$ and the monitor pair $M_1-M_2$, as corrected by the geometrical constant K. After amplification by amplifier 53, that portion of the difference signal from amplifier 53 which is in-phase with the signal from oscillator 45 is detected by phase-sensitive detector 54 and applied as a DC control signal to gate 55. Whenever the DC control signal from phase-sensitive detector 54 reaches a certain desired level, gate 55 opens and allows the signal from oscillator 45 to pass through to recorder 44 at the surface of the earth via conductor pair 14a.

Thus, it can be seen that the monitor pair electrodes $M_1-M_2$ measure the potential difference between points in a region relatively close to the pad member 28, and monitor pair $M_2-M_3$ and $M_2-N$ measure the potential difference at points located in a region further away from the pad member 28. Since the current emitted from electrode A is maintained constant, the potential differences sensed by the respective monitor pairs are indicative of the resistivity of the earth formations at different lateral depths in the borehole, and thus the signal applied to amplifier 53 is indicative of the difference between the resistivity of a region at some distance from the pad member 28 and the resistivity of a region relatively close to the pad member 28. If there is a mudcake present on the wall of the borehole, it will have a much greater effect on the monitor pair $M_1-M_2$ than on either the monitor pair $M_2-M_3$ or $M_2-N$, and thus a difference signal will be applied to amplifier 53. On the other hand, if there is no mudcake present, monitor pair $M_1-M_2$ should give approximately the same resistivity reading as either monitor pair $M_2-M_3$ or $M_2-N$ since all of the monitor pairs would then be responsive primarily to the resistivity $R_{XO}$ of the invaded zone.

Since the thickness of the mudcake has an effect on the difference signal applied to amplifier 53, and the thickness of the mudcake is, to a large extent, dependent on the type of mud used in the borehole if a permeable zone is present, the potential at which gate 55 will become energized can be adjusted in accordance with the type of mud used. Thus, a signal will be provided on conductor pair 14a whenever the potential of the signal applied to gate 55 is of such a magnitude as to indicate a permeable zone.

However, a problem arises when gate circuit 55 is responsive to the difference between the resistivity as measured by monitor pair $M_2-M_3$ or $M_2-N$ and the resistivity measured by monitor pair $M_1-M_2$. It is known that the ratio of the resistivity $R_{XO}$ of the invaded zone to the resistivity $R_{MC}$ of the mudcake may vary to a large extent. As this ratio $R_{XO}/R_{MC}$ varies, the magnitude of the signal applied to amplifier 53 will vary to a large extent even if the mudcake thickness remains constant. Thus, if the threshold of gate 55 is set for a given value of $R_{XO}/R_{MC}$, it may be inaccurate when $R_{XO}/R_{MC}$ varies.

Figure 3:
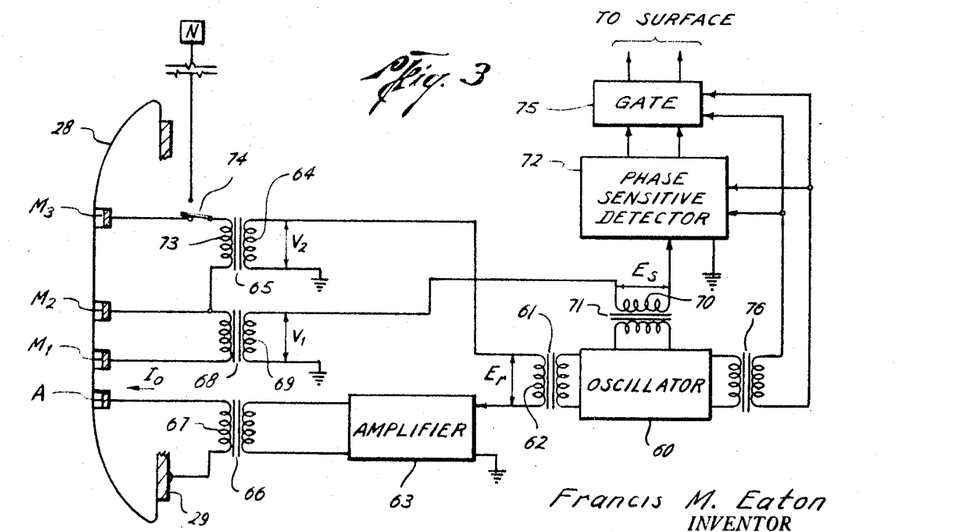
FIGURE 3 illustrates the various electrodes along with a schematic representation of another embodiment of the electrical circuitry utilized in connection with the present invention.

Looking now at FIGURE 3, there is shown another embodiment of the present invention wherein variations in $R_{XO}/R_{MC}$ do not substantially affect the accuracy of the mudcake indication signal supplied to the surface of the earth. In the FIGURE 3 apparatus, one output of an oscillator 60 is connected to the primary winding of a transformer 61, the secondary winding 62 of which is connected between one side of the input to a high gain amplifier 63 and one side of the secondary winding 64 of a transformer 65. The other side of the secondary winding 64 and the other side of the input to amplifier 63 are connected to ground. The ground symbol represents the chassis of the downhole electronic equipment, or the support means, as desired. The output from amplifier 63 is connected to the primary winding of a transformer 66, the secondary winding 67 of which is connected between the survey electrode A and the pad back plate 29.

The monitor electrodes $M_1$ and $M_2$ are connected across the primary winding of a transformer 68, the secondary winding 69 of which is connected between ground and one side of the secondary winding 70 of a transformer 71. The other side of the secondary winding 70 is connected to one side of the input to a phase-sensitive detector 72, the other side being connected to ground. The primary winding of transformer 71 is fed from another output of the oscillator 60. The monitor electrode $M_2$ is also connected to one side of the primary winding 73 of transformer 65, the other side of primary winding 73 being connected to the common terminal of a double switch 74. One of the switching contacts of switch 74 is connected to monitor electrode $M_3$ and the other switching contact is connected to remote monitor electrode N. The oscillator 60 supplies a phase-reference signal to phase-sensitive detector 72, and is connected to the input of gate circuit 75. Phase-sensitive detector 72 supplies a control signal to gate circuit 75.

Now concerning the operation of the FIGURE 3 embodiment, the electrodes A, $M_1$, $M_2$, $M_3$, N, and the pad back plate 29 perform the same function as in the FIGURE 1 embodiment. Oscillator 60 provides a constant reference voltage $E_r$ across the secondary winding 62 of transformer 61. This constant reference voltage produces a survey current $I_0$ between the survey current electrode A and the pad back plate 29. This survey current produces a potential gradient between monitor electrodes $M_2$ and $M_3$ or N, which in turn induces a voltage $V_2$ across the secondary winding 64 of transformer 65. A voltage proportional to the difference between $E_r$ and $V_2$ is applied to the input of amplifier 63. Since $E_r$ is constant and amplifier 63 has a high gain, the voltage $V_2$ induced into the secondary winding 64 of tarnsformer 65 will be substantially constant and equal to $E_r$. In other words, $E_r$ will be equal to $V_2$ plus the input voltage applied to amplifier 63 and since this input voltage is very small (due to amplifier 63 having a high gain), $V_2$ will be substantially equal to $E_r$.

The relationship for the survey current $I_0$ can be written as:

$$I_0 = \frac{K_2 V_2}{R_2} \qquad (1)$$

where $K_2$ is the geometrical constant of the $M_2$–$M_3$ or $M_2$–N monitor pair, depending on the position of switch 74, and $R_2$ is the resistivity measured between the monitor pair $M_2$–$M_3$ or $M_2$–N.

It is known that the voltage $V_1$ induced into the secondary winding 69 of transformer 68, which voltage $V_1$ is proportional to the potential gradient between monitor pair $M_1$–$M_2$ is equal to:

$$V_1 = \frac{R_1 I_0}{K_1} \qquad (2)$$

where $K_1$ is the geometrical constant of the monitor pair $M_1$–$M_2$, and $R_1$ is the resistivity measured by the monitor pair $M_1$–$M_2$.

Combining Equations 1 and 2 we have:

$$V_1 = \frac{R_1 K_2 V_2}{K_1 R_2} \qquad (3)$$

Since $V_2$, $K_2$, $K_1$ are all constants, we can rewrite Equation 3 as:

$$V_1 = C \frac{R_1}{R_2} \qquad (4)$$

where C is a constant equal to $K_2 V_2/K_1$.

A constant voltage $E_s$ is induced into the secondary winding 70 of transformer 71 and is subtracted from the voltage $V_1$ which is induced into the secondary winding 69 of transformer 68. Thus, a voltage is applied to phase-sensitive detector 72 which has a magnitude equal to $V_1$–$E_s$. The output from phase-sensitive detector 72 is a DC control signal proportional to the in-phase component of the voltage $V_1$–$E_s$ applied to phase-sensitive detector 72. Whenever the DC control signal from phase-sensitive detector 72 is greater than a given reference voltage, in this case zero volts, gate 75 is energized thus allowing the AC signal from oscillator 60 to pass to the surface of the earth. The constant voltage $E_s$ is adjusted to be equal to $V_1$ when $V_1$ indicates a predetermined value corresponding to a given mudcake thickness. (Recall from Equation 4 that $V_1$ is proportional to the resistivity ratio $R_1/R_2$.) Thus, if the magnitude of $V_1$ exceeds this preset value of $E_s$, a signal is transmitted to the surface of the earth from gate 75 indicative of the ratio $R_1/R_2$ being greater than the preselected value and thus indicative of the mudcake being thicker than the predetermined value. Alternatively, secondary winding 69 could be applied directly to phase-sensitive detector 72 and gate 75 set to trigger at a given voltage, as in the FIGURE 1 embodiment.

Figure 4:
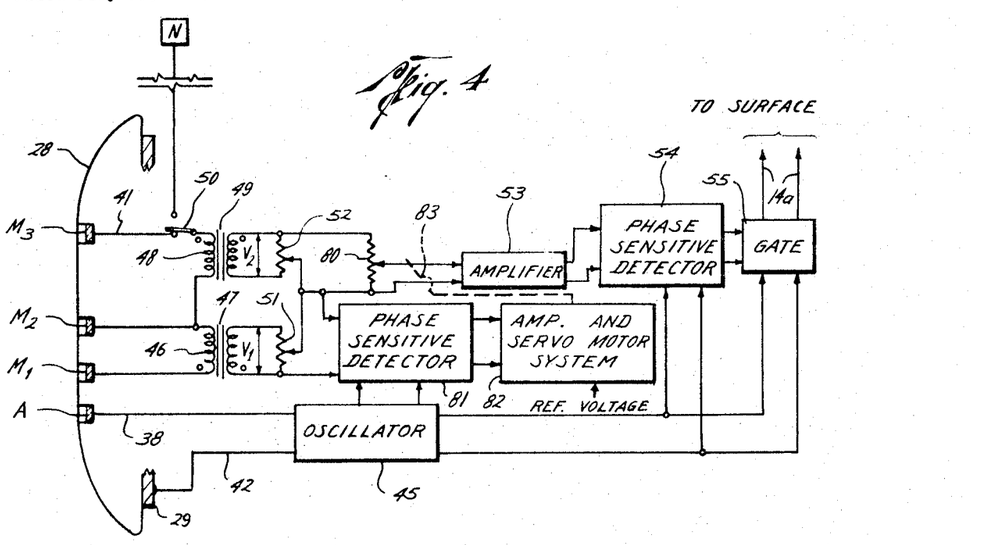
FIGURE 4 illustrates the various electrodes of the present invention together with a schematic representation of another embodiment of the electrical circuitry utilized in connection with the present invention.

Looking now at FIGURE 4, there is shown still another embodiment of the present invention, using the ratio of the signals $V_1$ and $V_2$. In the FIGURE 4 apparatus, the electrodes A, $M_1$, $M_2$, $M_3$, and the pad back plate 29 along with switch 50, transformers 47 and 49, potentiometers 51 and 52, oscillator 45, amplifier 53, phase-sensitive detector 54, gate circuit 55 and conductor pair 14a are the same as the identically numbered apparatus in FIGURE 2. As in the FIGURE 2 apparatus, oscillator 45 supplies survey current between the survey current-emitting electrode A and the back plate 29 of pad member 28. The monitor electrodes $M_1$, $M_2$, and $M_3$ or N sense the potentials existing at the various monitor electrodes and induce signals into the secondary windings of transformers 47 and 49 in the same manner as in the FIGURE 2 apparatus. Potentiometers 51 and 52 likewise serve the same purpose as in the FIGURE 3 apparatus.

However in the FIGURE 4 apparatus a different means of determining the ratio of the signals induced into the secondary windings of transformers 47 and 49 is utilized. The wiper arms of potentiometers 51 and 52 and one side of the resistance portion of potentiometer 52 are connected across the resistance portion of a potentiometer 80. The wiper arms of potentiometers 51 and 52 and one side of the resistance portion of potentiometer 51 are supplied to the input of a phase-sensitive detector 81, the phase-reference signal being supplied from oscillator 45. The output of phase-sensitive detector 81 supplied to an amplifier and servomotor system 82 of standard design. The mechanical output shaft 83 from the servomotor portion of amplifier and servomotor system 82 drives the wiper arm of potentiometer 80. The wiper arm of potentiometer 80 and one side of the resistance portion thereof are applied to the input of amplifier 53. Amplifier 53, phase-sensitive detector 54, and gate circuit 55 operate in the same manner as in the FIGURE 3 apparatus.

Now, concerning the operation of the FIGURE 4 apparatus, the signal applied across the resistance portion of potentiometer 80 is equal to $V_2$. The position of the wiper arm of potentiometer 80, which is controlled by shaft 83, is inversely proportional to the voltage $V_1$ applied across the resistance portion of potentiometer 51. Thus the signal applied to amplifier 53 is proportional to the ratio of $V_1$ to $V_2$. This ratio signal is then used to energize gate circuit 55 to enable the signal from oscillator 45 to pass to the surface of the earth via conductor pair 14a, thus indicating the presence of mudcake.

Figure 5:
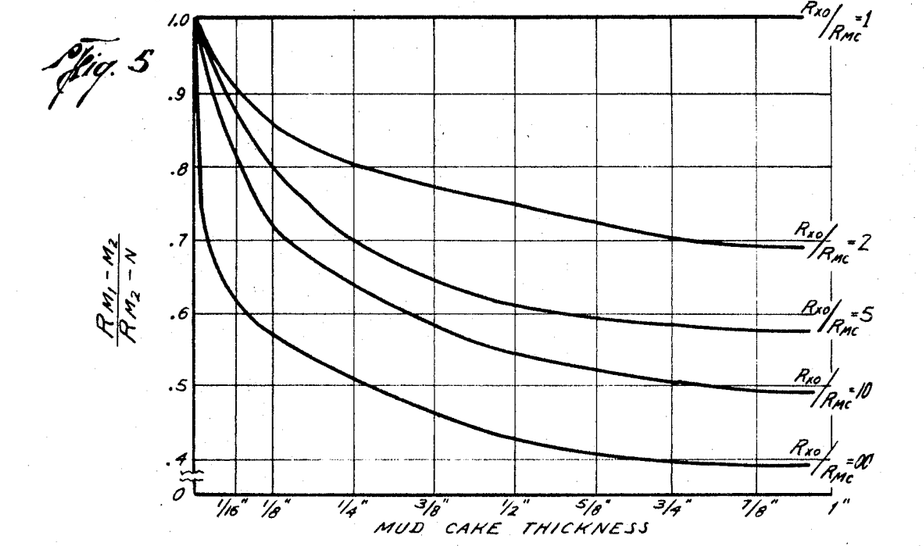
FIGURES 5 and 6 are graphs utilized in the explanation of the theory of the present invention.
Figure 6:
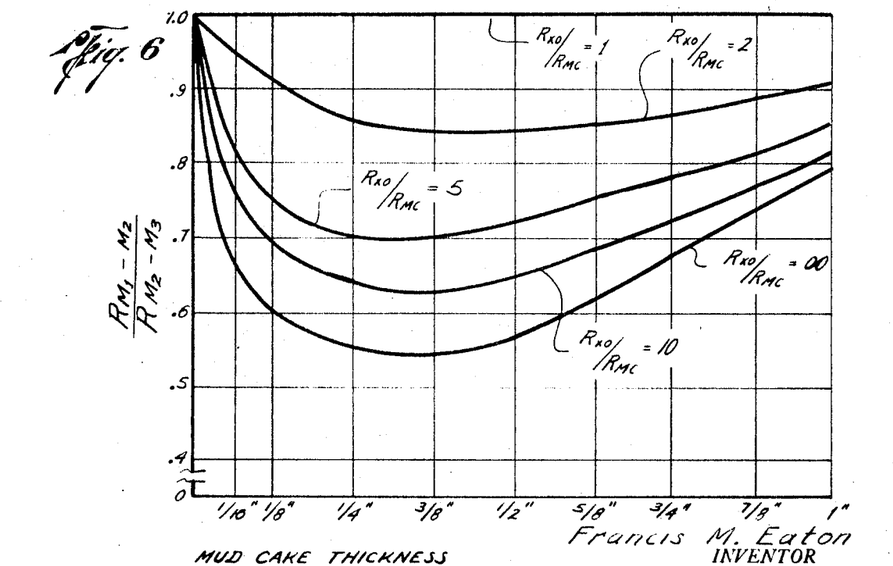

Looking now at FIGURES 5 and 6, there are shown graphs of mudcake thickness versus the ratio of the resistivities measured by the apparatus of FIGURE 3 or 4 for different values of $R_{XO}/R_{MC}$. The ratio of resistivity represented in FIGURE 5 is the resistivity $R_{M_1-M_2}$ as measured by the monitor electrode pair $M_1-M_2$ and the resistivity $R_{M_2-N}$ as measured by the monitor pair $M_2-N$. The ratio of resistivities shown in FIGURE 6 is the ratio of the resistivity $R_{M_1-M_2}$ to the resistivity $R_{M_2-M_3}$ as measured by the monitor pair $M_2-M_3$. The curves of FIGURES 5 and 6 are representative of the curves that can be expected from apparatus of the type shown in FIGURE 1, with the electrode spacing between electrodes A and $M_1$ being equal to the spacing between electrodes $M_1$ and $M_2$ and the spacing between $M_2$ and $M_3$ being twice the spacing A–$M_1$ and $M_1$–$M_2$. The $M_1$–$M_2$ electrode spacing of FIGURE 4 is one-inch and the geometrical constant $K_{M_1-M_2}$ of the $M_1-M_2$ monitor pair is 0.32 and the geometrical constant $K_{M_2-N}$ of the $M_2-N$ monitor pair is 0.51. In FIGURE 6, the electrode spacing $M_1-M_2$ is one-half inch with a geometrical constant $K_{M_1-M_2}$ of 0.18. The geometrical constant $K_{M_2-M_3}$ of the $M_2-M_3$ monitor pair in FIGURE 6 is 0.38. These values of electrode spacing and geometrical constants have been found, after a great deal of experimentation, to give good results for most normally encountered borehole conditions, but may vary depending on the particular borehole conditions found in practice.

It can be seen from FIGURES 5 and 6 that the ratio of resistivities will vary somewhat depending on the value of $R_{XO}/R_{MC}$. The apparatus corresponding to the graph of FIGURE 6 will provide a more accurate indication of mudcake for mudcake thicknesses less than about 3/8 of an inch since the curves are relatively close together, especially for the more frequently encountered case of $R_{XO}/R_{MC}$ between 5 and infinity. The curves in the FIGURE 6 graph begin approaching $$\frac{R_{M_1-M_2}}{R_{M_2-M_3}}=1$$

as the mudcake becomes thicker, since the $M_2-M_3$ monitor pair is influenced more and more by the mudcake as the mudcake thickness increases. On the other hand, the curves in the graph of FIGURE 5 continue toward $$\frac{R_{M_1-M_2}}{R_{M_3-N}}=0$$

as the mudcake increases since the $M_2-N$ monitor pair is less affected by mudcake than the $M_2-M_3$ monitor pair.

Thus, in situations where the mudcake thickness is expected to be great, the apparatus corresponding to the graph of FIGURE 5 would provide a better indication of the mudcake than that corresponding to the graph of FIGURE 6. However, the distance between the monitor electrodes $M_2$ and $M_3$ could be increased so that the monitor pair $M_2-M_3$ would be more responsive to the earth formation behind the mudcake, that is $R_{XO}$, and less responsive to the mudcake itself, that is $R_{MC}$, thus improving the results when thick mudcakes are encountered. However, it is advantageous to use the $M_1-M_2$ and $M_2-M_3$ monitor electrodes since it is generally considered advantageous to make measurements in the same manner when looking for small differences. Thus, by using two sets of closely spaced-apart electrodes with one set having somewhat greater electrode spacing, small differences between the two sets of electrodes can be measured with good accuracy.

Looking at FIGURES 3, 5 and 6 in conjunction, the voltage $E_s$ which is induced into the secondary windings 70 of transformer 71 in FIGURE 3 can be adjusted such that gate circuit 75 will only be energized when a given resistivity ratio is encountered. Thus, as an example, if the voltage $E_s$ which is induced into the secondary windings 70 of transformer 71 is set equal to a value corresponding to .75 in the FIGURE 6 graph, gate 75 will be energized whenever the voltage $V_1$ induced into the secondary winding 69 of transformer 68 falls below the voltage corresponding to a resistivity ratio of .75, thus indicating the presence of mudcake. In FIGURE 4, the threshold level of gate 55 is set at the desired voltage, in this example, the value corresponding to $$\frac{R_{M_1-M_2}}{R_{M_2-M_3}}=.75$$

In FIGURE 6, it can be seen that the resistivity ratio .75 corresponds to a 1/32 inch mudcake at $$\frac{R_{XO}}{R_{MC}}=\text{infinity}$$

a 1/16 inch mudcake at $$\frac{R_{XO}}{R_{MC}}=10$$

and a 1/8 inch mudcake at $$\frac{R_{XO}}{R_{MC}}=5$$

The curve corresponding to $$\frac{R_{XO}}{R_{MC}}=2$$

falls below $$\frac{R_{M_1-M_2}}{R_{M_2-M_3}}=.75$$

in the FIGURE 6 graph, but this value of $R_{XO}/R_{MC}$ is very seldom encountered in practice.

Figure 7:
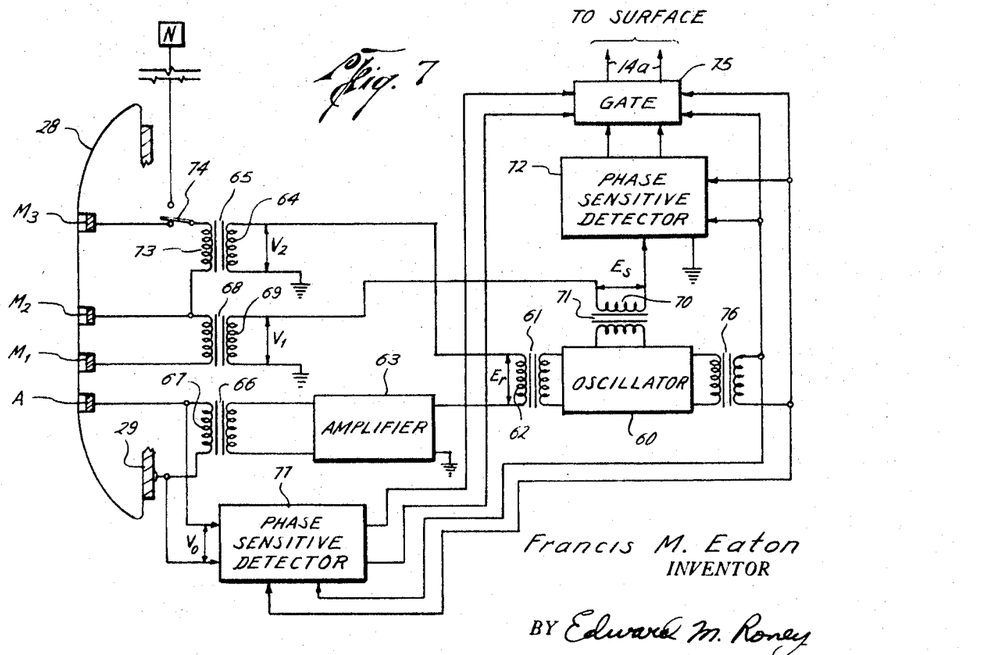
FIGURE 7 illustrates the various electrodes of the present invention along with a schematic representation of still another embodiment of the electrical circuitry utilized in connection with the present invention.

It would be desirable to vary the threshold value of gate 75 in FIGURE 3 in accordance with the variation of $R_{XO}/R_{MC}$ so that the thickness of mudcake detected at all values of $R_{XO}/R_{MC}$ would be the same. Looking at FIGURE 7, there is shown the apparatus for performing this function. The apparatus of FIGURE 7 is identical to the apparatus of FIGURE 3, with the exception that the survey current electrode A and the pad back plate 29 are connected across the input of a phase-sensitive detector 77, the output of phase-sensitive detector 77 being connected to the gate 75. A phase-reference signal from the secondary winding of transformer 76 is also supplied to phase-sensitive detector 77. The DC output signal from phase-sensitive detector 77 is utilized to vary the threshold voltage of gate 75. This is accomplished by conventional means, as for example, using the DC control signal from phase-sensitive detector 77 to vary the threshold voltage of a Schmitt trigger.

Now concerning the theory of operation of the FIGURE 7 apparatus, since the survey current electrode A is small, the potential $V_0$ between survey current electrode A and the pad back plate 29 will be mostly a function of the resistivity of the mudcake $R_{MC}$. This is because the smaller the electrode, the greater will be the potential drop at distances close to the electrode. Thus, the relationship for the resistivity $R_{MC}$ of the mudcake can be written as:

$$R_{MC}=\frac{K_0 V_0}{I_0} \qquad (5)$$

where $K_0$ is the geometrical constant of the survey current electrode A. The resistivity measured by the monitor pair $M_2$–$M_3$ is a function primarily of the invaded zone resistivity $R_{XO}$ for most of the mudcake thicknesses encountered in practice. Since, in the FIGURE 7 apparatus, the voltage between the monitor electrodes $M_2$ and $M_3$ is held constant, the survey current $I_0$ will be inversely proportional to the invaded zone resistivity $R_{XO}$. Thus, the relationship of the survey current $I_0$ can be written as:

$$I_0 = \frac{K_{M_2-M_3} V_2}{R_{XO}} \quad (6)$$

where $K_{M_2-M_3}$ equals the geometrical constant of the monitor pair $M_2$–$M_3$.

Solving Equations 5 and 6 for the voltage $V_0$ at the survey electrode A:

$$V_0 = \frac{R_{MC} K_{M_2-M_3} V}{K_0 R_{XO}} \quad (7)$$

Since $M_{M_2-M_3}$, $V_2$, and $V_0$ are all constants, Equation 7 can be rewritten as:

$$V_0 = C \frac{R_{MC}}{R_{XO}} \quad (8)$$

where C is equal to $$\frac{K_{M_2-M_3} V_2}{K_0}$$

Thus, the output signal from phase-sensitive detector 77 is a DC control signal proportional to $R_{MC}/R_{XO}$. This control signal is used to vary the threshold voltage of gate 75 so that gate 75 will be energized to indicate a given thickness of mudcake regardless of the value of $R_{MC}/R_{XO}$.

It is to be understood that either the monitor pair $M_2$–$M_3$ or the monitor pair $M_2$–N can be used with the monitor pair $M_1$–$M_2$ in all of the embodiment of this invention. Additionally, the signals derived from the monitor pairs could be transmitted independently to the surface of the earth, and the difference or ratio of the monitor pair signals taken at the surface. Thus, taking FIGURE 2 as an example, the signals derived across the secondary winding of transformers 47 and 49 could be transmitted independently to the surface and the remainder of the apparatus of FIGURE 2 located at the surface. Likewise, the difference or ratio signal could be transmitted to the surface and either recorded as such, or used to trigger a gate circuit at the surface. Thus, for example, the output of phase-sensitive detector 54 in FIGURE 2 could be transmitted to the surface of the earth.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole, comprising:
   (a) a support means, including a borehole wall-engaging pad member, for supporting a plurality of electrodes for movement through a borehole, the electrodes including:
      (1) a current-emitting electrode adapted for emitting current into the earth formations surrounding a borehole;
      (2) a plurality of monitoring electrodes located at different distances from the current-emitting electrode;
   (b) means for supplying survey current between the current-emitting electrode and a current return point;
   (c) means responsive to the difference between the potentials of two monitoring electrodes located on the pad member for providing a first potential difference signal which is representative of the resistivity of a mudcake on a borehole wall;
   (d) means responsive to the difference between the potentials of two of the monitoring electrodes for providing a second potential difference signal, the interval defined by the first mentioned two monitoring electrodes being closer to the current-emitting electrode than the interval defined by the last mentioned set of two monitoring electrodes; and
   (e) means for taking the ratio of one of the potential difference signals to the other to obtain an output signal which is informative of mudcake thickness.

2. Apparatus for investigating earth formations traversed by a borehole, comprising:
   (a) a support means, including a borehole wall-engaging pad member, for supporting a plurality of electrodes for movement through a borehole, the electrodes including:
      (1) a current-emitting electrode adapted for emitting current into the earth formations surrounding a borehole;
      (2) a plurality of monitoring electrodes located at different distances from the current-emitting electrode;
   (b) means for supplying survey current between the current-emitting electrode and a current return point;
   (c) means responsive to the difference between the potentials of two monitoring electrodes located on the pad member for providing a first potential difference signal which is representative of the resistivity of a mudcake on a borehole wall;
   (d) means responsive to the difference between the potentials of two of the monitoring electrodes for providing a second potential difference signal, the interval defined by the first mentioned two monitoring electrodes being closer to the current-emitting electrode than the interval defined by the last mentioned set of two monitoring electrodes; and
   (e) means for subtracting one potential difference signal from the other to obtain an output signal which is informative of mudcake thickness.

3. The apparatus of claim 1 and further including gate means responsive to said output signal attaining a given amplitude for generating a transmission signal indicative of the mudcake thickness exceeding a given amount.

4. The apparatus of claim 2 and further including gate means responsive to said output signal attaining a given amplitude for generating a transmission signal indicative of the mudcake thickness exceeding a given amount.

5. Apparatus for investigating earth formations traversed by a borehole, comprising:
   (a) support means, inclding a borehole wall-engaging pad member, for supporting a plurality of electrodes for movement through a borehole, the electrodes including:
      (1) a current-emitting electrode located on the pad member and adapter for emitting current into the earth formations surrounding the borehole;
      (2) three monitoring electrodes located at different distances from the current-emitting electrode on the pad member;
   (b) means for supplying survey current between the current-emitting electrode and a current return point;
   (c) means responsive to the potential difference between certain ones of the monitor electrodes for providing a first signal representative of the resistivity of a first region of the surrounding earth formations;
   (d) means responsive to the potential difference between certain ones of the monitor electrodes for providing a second signal representative of the resistivity of a second region of the surrounding earth formations;
   (e) means responsive to the first and second signals for providing a third signal representative of a relationship between the first and second signals; and
   (f) means responsive to the third signal for providing a signal indicative of mudcake thickness.

6. Apparatus for investigating earth formations traversed by a borehole, comprising:
   (a) a support means for carrying a plurality of electrodes through a borehole, the electrodes including:
      (1) a current-emitting electrode adapted for emitting current into the earth formations surrounding a borehole;
      (2) a plurality of monitoring electrodes located at different distances from the current-emitting electrode;
   (b) means responsive to a first signal representative of the potential difference between two of the monitor electrodes for supplying survey current between the current-emitting electrode and a current return point, the region between the two monitor electrodes being located at a first distance from the current-emitting electrode; and
   (c) means responsive to the potentials of at least a portion of the plurality of monitoring electrodes for providing a signal indicative of the thickness of the mudcake surrounding a borehole.

7. A method of investigating earth formations traversed by a borehole, comprising:
   (a) moving a plurality of electrodes through a borehole, at least some of the electrodes mounted on a borehole wall-engaging pad member, the electrodes including:
      (1) a current-emitting electrode adapted for emitting current into the earth formations surrounding a borehole;
      (2) a plurality of monitoring electrodes located at different distances from the current-emitting electrode;
   (b) supplying survey current between the current-emitting electrode and a current return point;
   (c) measuring the difference in potential between two of the electrodes mounted on the pad member to provide a first potential difference signal which is representative of the resistivity of a mudcake on a borehole wall;
   (d) measuring the difference between the potentials of two monitor electrodes to produce a second potential difference signal, the interval defined by the first mentioned two monitoring electrodes being closer to the current-emitting electrodes than the interval defined by the last mentioned set of two monitoring electrodes; and
   (e) measuring the ratio of one of the potential difference signals to the other to produce an output signal which is informative of mudcake thickness.

8. A method of investigating earth formations traversed by a borehole, comprising:
   (a) moving a plurality of electrodes through a borehole, at least some of the electrodes mounted on a borehole wall-engaging pad member, the electrodes including:
      (1) a current-emitting electrode adapted for emitting current into the earth formations surrounding a borehole;
      (2) a plurality of monitoring electrodes located at different distances from the current-emitting electrode;
   (b) supplying survey current between the current-emitting electrode and a current return point;
   (c) measuring the difference in potential between two of the electrodes mounted on the pad member to provide a first potential difference signal which is representative of the resistivity of a mudcake on a borehole wall;
   (d) measuring the difference between the potentials of two monitor electrodes to produce a second potential difference signal, the interval defined by the first mentioned two monitoring electrodes being closer to the current-emitting electrode than the interval defined by the last mentioned set of two monitoring electrodes; and
   (e) subtracting one potential difference signal from the other to obtain an output signal which is informative of mudcake thickness.

9. A method of investigating earth formations traversed by a borehole, comprising:
   (a) moving a plurality of electrodes through the borehole, the electrodes including:
      (1) a current-imitting electrode adapted for emitting current into the earth formations surrounding the borehole;
      (2) a plurality of monitoring electrodes located at different distances from the current-emitting electrode;
   (b) supplying survey current between the current-emitting electrode and a current return point in response to a first signal representative of the difference between the potential on two of the monitor electrodes, the region between said two monitor electrodes located at a first distance from the current-emitting electrode; and
   (c) generating a signal indicative of the thickness of the mudcake surrounding the borehole in response to the potential of at least a portion of the plurality of monitoring electrodes.

10. The apparatus of claim 5 wherein the relationship between the first and second signals is the difference in potential between the first and second signals.

11. The apparatus of claim 5 wherein the relationship between the first and second signals is the ratio of the potential of the first signal to the potential of the second signal.

12. The apparatus of claim 1 wherein at least one of the monitor electrodes is located at a distance from the wall-engaging pad member.

13. The apparatus of claim 6 wherein the means for providing a signal indicative of mudcake thickness is also responsive to the potential of the current-emitting electrode.

14. The apparatus of claim 6 wherein:
   (1) the means for supplying survey current includes amplifier means responsive to the potential difference between the first signal and a constant potential signal for supplying sufficient survey current to hold the potential of the first signal substantially constant; and
   (2) the means for providing a signal indicative of the presence of mudcake includes:
      (a) means responsive to the potential difference between two of the monitor electrodes whose region is located at a second distance from the current-emitting electrode for providing a second signal indicative of a relationship between the resistivities of the first and second regions;
      (b) gate means responsive to the second signal for providing the signal indicative of mudcake thickness when the second signal attains a given amplitude.

15. The apparatus of claim 14 and further including means responsive to the potential of the current-emitting electrode for varying the given amplitude at which the gate means provides the signal indicative of the mudcake thickness.

16. The method of claim 9 wherein the step of generating a signal indicative of the mudcake thickness includes:
   (1) generating a second signal in response to the potential difference between two of the monitor electrodes whose region therebetween is located at a second distance from the current-emitting electrode, the second signal being representative of a relationship between the resistivities of the first and second regions; and
   (2) generating the signal indicative of the mudcake thickness when the amplitude of the second signal attains a given level.

17. The method of claim 16 and further including the step of varying the given level at which the signal indicative of mudcake thickness is generated, in response to the potential of the current-emitting electrode.

18. Apparatus for investigating the thickness of a mudcake surrounding a borehole, comprising:
 (a) a plurality of electrodes adapted for movement through the borehole including:
  (1) a current-emitting electrode adapted for emitting current into the earth formations surrounding the borehole;
  (2) at least three monitoring electrodes located at different distances from the current-emitting electrode, said monitoring electrodes comprising two separate monitoring electrode pairs;
 (b) means for supplying survey current between the current-emitting electrode and a current return point;
 (c) means responsive to the potentials of at least one pair of the plurality of monitoring electrodes for controlling the magnitude of the survey current emitted into the surrounding earth formations; and
 (d) means responsive to the potentials of at least one other pair of monitoring electrodes for providing a signal indicative of the thickness of the mudcake surrounding the borehole.

19. Apparatus for investigating the thickness of a mudcake surrounding a borehole, comprising:
 (a) a plurality of electrodes adapted for movement through the borehole including:
  (1) a current-emitting electrode adapted for emitting current into the earth formations surrounding the borehole;
  (2) a plurality of monitoring electrodes located at different distances from the current-emitting electrode;
 (b) means for supplying survey current between the current-emitting electrode and a current return point;
 (c) means responsive to the potentials of at least a portion of the plurality of monitoring electrodes for providing a first signal indicative of the mudcake thickness; and
 (d) means responsive to the potential of the current-emitting electrode and the first signal indicative of mudcake thickness for providing a second mudcake thickness signal whereby said second mudcake thickness signal will be a more accurate representation of mudcake thickness.

20. Apparatus for investigating the thickness of a mudcake surrounding a borehole, comprising:
 (a) a plurality of electrodes adapted for movement through the borehole, at least a portion of the electrodes mounted on a wall-engaging pad member, including:
  (1) a current-emitting electrode mounted on the pad member and adapted for emitting current into the earth formations surrounding the borehole;
  (2) a plurality of monitoring electrodes located at different distances from the current-emitting electrode, at least a portion of the monitoring electrodes mounted on the pad member;
 (b) means for supplying survey current between the current-emitting electrode and a current return point;
 (c) means responsive to the potentials of at least a portion of the plurality of monitoring electrodes for providing a first signal; and
 (d) means responsive to the amplitude of the first signal exceeding a given amplitude level for producing a signal indicative of the mudcake thickness exceeding a given thickness.

21. The apparatus of claim 20 and further including means responsive to the potential of the current-emitting electrode for adjusting the given amplitude level at which the signal indicative of mudcake thickness is generated whereby said mudcake thickness signal will be substantially accurate for substantially all borehole conditions.

References Cited

UNITED STATES PATENTS

| | | | |
|---|---|---|---|
| 2,669,688 | 2/1954 | Doll | 324—1 |
| 2,965,838 | 12/1960 | Kister | 324—10 XR |
| 3,002,148 | 9/1961 | Nall | 324—1 |
| 3,075,142 | 1/1963 | Albright et al. | 324—1 |
| 3,132,298 | 5/1964 | Doll et al. | 324—1 XR |
| 3,166,708 | 1/1965 | Millican | 324—1 |
| 3,134,941 | 5/1964 | Norelius | 324—10 XR |

GERARD R. STRECKER, Primary Examiner